United States Patent
Field et al.

(10) Patent No.: US 11,886,528 B2
(45) Date of Patent: *Jan. 30, 2024

(54) SELF-VALIDATING DATA OBJECT LOCATOR FOR A MEDIA ASSET

(71) Applicant: Comcast Cable Communications, LLC, Philadelphia, PA (US)

(72) Inventors: Brian Field, Evergreen, CO (US); Jan van Doorn, Castle Rock, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,195

(22) Filed: Dec. 22, 2022

(65) Prior Publication Data

US 2023/0281263 A1 Sep. 7, 2023

Related U.S. Application Data

(63) Continuation of application No. 17/704,661, filed on Mar. 25, 2022, now Pat. No. 11,568,016, which is a continuation of application No. 13/448,871, filed on Apr. 17, 2012, now Pat. No. 11,321,414.

(51) Int. Cl.

| G06F 15/16 | (2006.01) |
|---|---|
| G06F 16/955 | (2019.01) |
| H04L 9/40 | (2022.01) |
| G06F 21/10 | (2013.01) |
| H04L 65/612 | (2022.01) |
| H04L 67/568 | (2022.01) |

(52) U.S. Cl.
CPC .......... *G06F 16/9566* (2019.01); *G06F 21/10* (2013.01); *H04L 63/0428* (2013.01); *H04L 63/1458* (2013.01); *G06F 21/1083* (2023.08); *H04L 65/612* (2022.05); *H04L 67/568* (2022.05)

(58) Field of Classification Search
CPC ..... H04L 67/02; H04L 63/08; H04L 63/0428; H04L 63/061; H04L 63/10; H04L 67/1014; H04L 67/1023; H04L 65/4084; H04L 9/14; H04L 2209/60; H04L 2209/603

See application file for complete search history.

(56) References Cited

U.S. PATENT DOCUMENTS

| 6,226,750 B1 | 5/2001 | Trieger |
| 7,249,219 B1 | 7/2007 | Mowat et al. |
| 7,412,495 B2 | 8/2008 | Nguyen |
| 7,783,041 B2 | 8/2010 | Asokan et al. |
| 7,848,955 B2 | 12/2010 | Leffert et al. |
| 2002/0083178 A1* | 6/2002 | Brothers ................ H04L 63/10 709/218 |

(Continued)

*Primary Examiner* — Oleg Survillo
(74) *Attorney, Agent, or Firm* — Ballard Spahr LLP

(57) ABSTRACT

Aspects of the disclosure relate to validation of a request for an asset based on information in the request. Validation of the request can be processed by a network node in a network repository that contains the asset. In one aspect, validation of the request can comprise determining if the request is legitimate based at least on processing at least a portion of the information in the request. In response to a legitimate request, the network node can process the request and, as a result, a data object associated with the asset can be supplied to a device originating the request. In the alternative, the network node can yield an exception.

20 Claims, 6 Drawing Sheets

(56) References Cited

U.S. PATENT DOCUMENTS

| | | |
|---|---|---|
| 2002/0103917 A1 | 8/2002 | Kay et al. |
| 2003/0097564 A1* | 5/2003 | Tewari ............... H04L 67/5682 |
| | | 713/193 |
| 2004/0006693 A1 | 1/2004 | Vasnani et al. |
| 2004/0093419 A1 | 5/2004 | Weihl et al. |
| 2005/0114531 A1 | 5/2005 | Kadyk et al. |
| 2006/0173783 A1 | 8/2006 | Marples et al. |
| 2006/0259492 A1 | 11/2006 | Jun et al. |
| 2007/0156845 A1 | 7/2007 | Devanneaux et al. |
| 2007/0294762 A1* | 12/2007 | Shraim ............... H04L 63/1491 |
| | | 726/22 |
| 2008/0263652 A1 | 10/2008 | McMurtry et al. |
| 2009/0007241 A1 | 1/2009 | Tewari et al. |
| 2009/0157527 A1* | 6/2009 | Bhambri ............ G06Q 30/0601 |
| | | 705/26.1 |
| 2010/0031000 A1 | 2/2010 | Flynn et al. |
| 2010/0281530 A1 | 11/2010 | Tarkoma |
| 2010/0299722 A1 | 11/2010 | Tewari et al. |
| 2011/0016169 A1* | 1/2011 | Cahill ..................... G06F 21/54 |
| | | 715/234 |
| 2011/0213959 A1 | 9/2011 | Bodi et al. |
| 2011/0265155 A1 | 10/2011 | Liu |
| 2011/0296179 A1 | 12/2011 | Templin et al. |
| 2012/0072237 A1 | 3/2012 | Campbell et al. |
| 2013/0010612 A1 | 1/2013 | Lee et al. |
| 2013/0046990 A1 | 2/2013 | Fahrny et al. |
| 2013/0080267 A1 | 3/2013 | McGowan |
| 2013/0163758 A1 | 6/2013 | Swaminathan et al. |
| 2013/0227283 A1 | 8/2013 | Williamson et al. |
| 2013/0311776 A1 | 11/2013 | Besehanic |
| 2014/0337958 A1 | 11/2014 | Knox et al. |

\* cited by examiner

SELF-VALIDATING DATA OBJECT LOCATOR FOR A MEDIA ASSET

CROSS-REFERENCE TO RELATED APPLICATIONS

This application is a continuation of U.S. application Ser. No. 17/704,661, filed on Mar. 25, 2022, which is a continuation of U.S. application Ser. No. 13/448,871, filed on Apr. 17, 2012, and issued as U.S. Pat. No. 11,321,414 on May 3, 2022, each of which are incorporated by reference in their entireties herein.

BACKGROUND

In a web-based approach to delivery of media assets, content can be encapsulated into fragments, wherein a fragment is a data object that can be retained in a network repository (either distributed or localized) and can be accessed through hypertext transfer protocol (HTTP). Increasing number of such network transactions can become problematic. Typically, the universal resource locator (URL) structure for the fragments comprises information (e.g., parameters) related to a time code (TC) for a fragment and an associated quality level in bits per seconds. Since the TC is not deterministic, a name space structure for URLs for respective fragments generally is sparse, with valid names being sparsely scattered in such name space. Accordingly, a properly formatted uniform resource locator (URL) can be processed by a network centralized node (e.g., an origin server, or origin node, in a content distribution network (CDN)) even though such URL can convey an invalid name for a fragment, wherein the network central node can manage, at least in part, the network repository. The network central node, in such scenario, consumes operational resources for processing the request comprising the invalid URL and, typically, responds with an error message. Such processing can rapidly become inefficient for scaling as, for example, size of a name space of fragments increases.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following more detailed description.

Some embodiments of the disclosure relate to validation of a request for an asset based on information in the request. Validation of the request can be processed by a network node (e.g., edge cache node) in a network repository (e.g., a CDN) that contains the asset. In one aspect, validation of the request can comprise determining if the request is legitimate based at least on processing (e.g., hashing) at least a portion of the information in the request. In response to a legitimate (or valid) request, the network node can process the request, and a data object associated with the asset can be supplied to a device originating the request. In the alternative, the network node can yield an exception, such as transmission of an error notification to such device.

When compared to conventional technologies such as caching of access error codes or locally storing cookies, one or more embodiments of the disclosure can afford various advantages related to validation of request for fragments. For example, sparsity of the name space of fragments associated with media assets can be accounted for by integrating information into the queries, the information permitting validation of a query prior to consuming processing resources of an originating node. It should be appreciated that such integration can be accomplished without substantive processing overhead, in view that a network edge node that processes such queries typically has available processing resources since the node, being a cache node, can be primarily bound by read/write operations. For another example, mitigation or avoidance of processing of non-legitimate queries for fragments can readily protect origin node(s) from denial-of-service attacks.

Additional aspects or advantages of the subject disclosure will be set forth in part in the description which follows, and in part will be apparent from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

DETAILED DESCRIPTION

Figure 1:
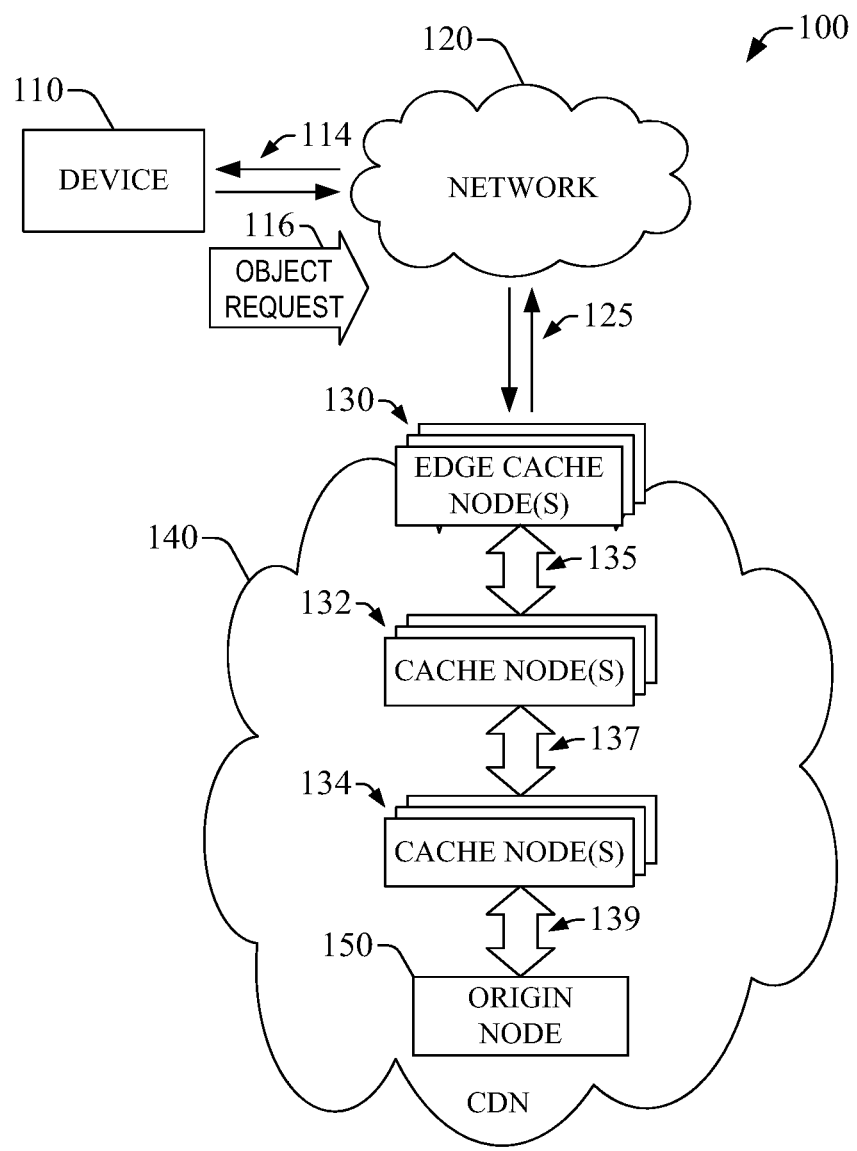
FIG. 1 illustrates an exemplary network environment in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for processing a request for an asset in a network. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function," "engine" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function," "engine" can be utilized interchangeably.

Throughout the description and claims of this specification, the words "comprise" and "having" and their variations, such as "comprising" and "comprises," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

One aspect of the disclosure identifies and addresses the issue of sparsity of the name space structure of data objects associated with a media asset. Such sparsity refers to presence of scattered valid values for names of such data objects even though the names having a well defined format. As described in greater detail below, the disclosure relates to processing queries for data objects, such as fragments, associated with a media asset. Certain functional elements of the disclosure can be implemented (e.g., performed) by software, hardware, or a combination of software and hardware. Functional elements of the various embodiment(s) described in the present specification and illustrated in the annexed drawings can be employed in operational environments (access network, telecommunication network, signaling network, etc.) that can include, for example, digital equipment, analog equipment, or both, wired or wireless equipment, etc.

Referring to the drawings, FIG. 1 illustrates a high-level block diagram of an exemplary network environment 100 in accordance with one or more aspects of the disclosure. In the exemplary network environment 100, a network repository can be queried for a data object associated with a media asset in accordance with one or more aspects of the disclosure. As illustrated, the exemplary network environment 100 comprises a device 110 functionally coupled (e.g., communicatively coupled via wired links or wireless links, or a combination thereof) to an access/delivery (A/D) network 120 which can include wireless networks, wireline networks, and any combination thereof. A data and signaling pipe 114 comprising an upstream link, or uplink (UL), and a downstream link, or downlink (DL), enables functional coupling among the device 110 and the network 120. The data and signaling pipe 114 can comprise a wireless link or wireline link, or a combination thereof. Device 110 can be embodied in or can comprise end-user equipment, such as a user device (mobile or otherwise) or most any customer premises equipment. Accordingly, device 110 can be an electronic device that is part of a network (e.g., a telecommunication network, a home network, a utilities network, or combinations thereof) and has various levels of computational capability. For example, the device 110 can be at least one of a terminal display device, a set top box (STB), an internet protocol (IP)-enabled television, a personal computer, a portable computer, a wearable computer, and so forth.

In one aspect, the device 110 can transmit an object request 116 to query a network repository (e.g., a content distribution network (CDN)) for a fragment (or data object) associated with a media asset intended to be received and/or consumed at the device 110. To transmit the object request 116 to the network repository, the device 110 can exploit the network 120, to which the device 110 can communicate in accordance with various packet-switched (PS) communication protocols supported by such network. For instance, the various packet-switched communication protocols can include one or more of an Ethernet protocol format; an Internet protocol (IP) format, such as IPv4 and IPv6, or the like; a user datagram protocol (UDP) format; HTTP; simple object access protocol (SOAP); or simple network management protocol (SNMP). Accordingly, in one aspect, device 110 can compose the object request 116 according to at least one of such protocols. When the object request 116 is composed according to HTTP, the object request 116 can adopt, for example, the following form: "http://streamer02.delivery-service-name.cdn2.comcast.net/key-id(138)/espn/timecode(42)/qualitylevel(300000)/hash(4ed345)". Such object request 116 comprises at least two portions, e.g., "key-id(138) and "hash(4ed345)" indicative, respectively, of a key identifier (key ID) and a hash value. A first portion of the at least two portions can be referred to as a first identifier (e.g., "key-id(138)") indicative of a first value, and a second portion of the at least two portions can be referred to as second identifier (e.g., "hash(4ed345)") indicative of a second value. More generally, in scenarios in which the object request 116 is composed according to a format other than HTTP, the object request 116 can comprise a first value suitably formatted and indicative of a key ID, and a second value suitably formatted and indicative of a reference hash value. As described herein, the key ID and the reference hash value can render the object request 116 a self-validating object resource locator in response to processing by the network repository.

The network 120 can include wireless networks, wireline networks, and any combination thereof, which can transmit the object request 116 to the network repository (e.g., CDN 140). In one aspect, the network 120 can include one or more of wide area networks (WANs), one or more local area networks (LANs), signaling networks (e.g., SS#7, etc.), and so forth. Such networks can operate in accordance with most any communication protocol for wireline communication or wireless communication. In certain embodiments, network 120 can have several functional elements that can provide a backbone network, such as a high-capacity packet-switched network. In other embodiments, network 120 can have internal structure, with several functional elements that can provide at least two main operational blocks: a backbone network (e.g., a high-capacity packet-switched network) and a regional access network (RAN). The internal structure also can include functional elements that provide more spatially localized networks, such as local area networks, home area networks, or the like. Both the backbone network and the regional access network (RAN) can be WANs, for example, with the backbone network having a larger geographical scope than the RAN.

Figure 2:
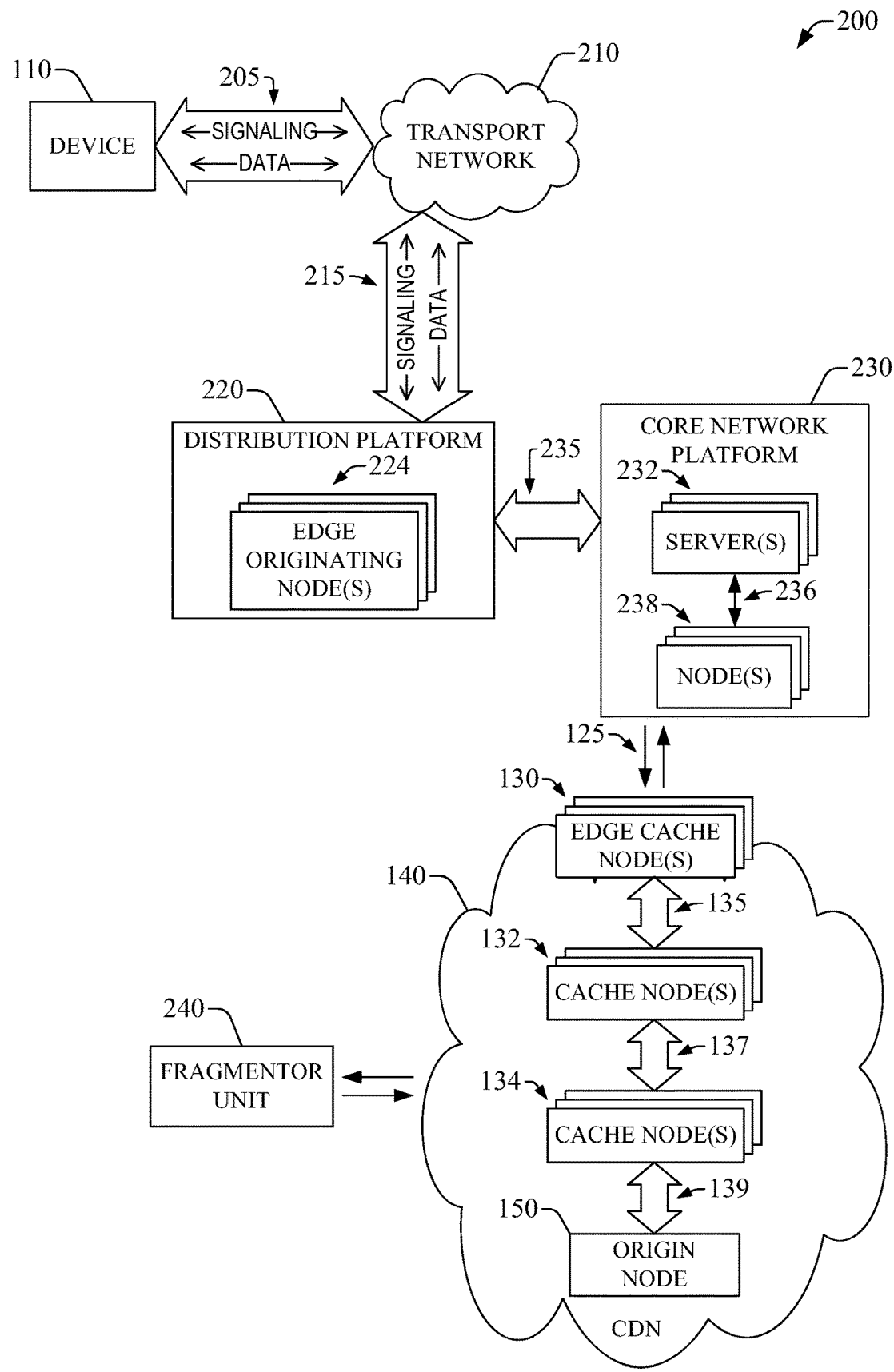
FIG. 2 illustrates an exemplary embodiment of a network in accordance with one or more aspects of the disclosure.

In one embodiment (e.g., exemplary embodiment 200 shown in FIG. 2), the network 120 can comprise a core network platform 230 functionally coupled with the CDN 140. The core network platform 230 can include various network nodes which can be distinguished according to their functionality. As illustrated, the various network nodes can comprise one or more servers 232, and one or more nodes 238 (e.g., gateway node(s)). The one or more servers 232 can comprise, for example, adaptation layer units, application server(s), management server(s), proxy server(s), and the like. Functionality and architecture of the one or more servers 232 and the one or more nodes 238 generally is specific, yet not exclusive, to the embodiment of the core network platform 120. For instance, in an exemplary embodiment in which the core network platform 230 embodies or comprises an IMS network, server(s) 122 can comprise application server(s), and specific function control nodes (e.g., Call Session Control Functions (CSCFs), such as serving CSCF (S-CSCF) and interrogating CSCF (I-CSCF)) and proxy servers; and node(s) 238 can comprise one or more gateway nodes having a breakout gateway control function (BGCF), a media gateway (MGW) and a signaling gateway (SGW), and media gateway control function (MGCF).

Network nodes in core network platform 230 can be functionally coupled through a bus 236. As illustrated, the bus 126 can enable exchange of information (e.g., data or signaling, or both) among server(s) 232 and node(s) 238 (e.g., gateway node(s), also referred to as gateway(s)). In certain embodiments, bus 236 can include a plurality of reference links (Cx, Cr, Dh, Dx, Gm, Ma, Mg, etc.), and related components, and bus architectures such as address buses, system buses, and the like.

The core network platform 230 can permit implementation of various network management operations (access authorization and accounting, provisioning, billing, etc.); content integrity monitoring; or network functionality comprising programming monitoring, advertisement monitoring, or both. In addition or in the alternative, the core network platform 230 can include an application layer having at least one server of the one or more servers 232.

The at least one server in the application layer can provide media content, such as media assets, which can be either linear-programming assets or non-linear assets (e.g., media-on-demand). In one aspect of web-based transmission of the media content, the at least one server can comprise a content server (not shown) that can encapsulate, or partition, the media content into fragments, or data objects. In one aspect, the content server (not shown) can format the fragments, or data objects, in accordance with any format (e.g., joint photographic experts group (JPEG) file interchange format (JFIF)) suitable for packet-switched transmission of media content. Encapsulation into fragments, also referred to as fragmentation, of a media asset can comprise compression of such asset. In one implementation, compression can be accomplished according to the JPEG compression method.

As illustrated in exemplary embodiment 200, the A/D network 120 can comprise a distribution platform 220 which can be functionality coupled to the core network platform 230 via a data and signaling pipe 235. Similarly to other data and signaling pipes disclosed herein, the data and signaling pipe 235 can comprise one or more of: a reference link, and related components; a conventional bus architectures such as address buses, system buses; wired links, such as fiber optic links, coaxial links, hybrid fiber-coaxial links, and various connectors (e.g., an Ethernet connector, an F connector, an RS-232 connector, or the like); wireless links (either terrestrial links or deep-space links); and so forth.

The distribution platform 220 can comprise one or more signal processing components (not shown) that can receive and operate on an information stream, such as a data stream, a signaling stream, or a combination thereof. Such component(s) can perform one or more operations on the information stream, such as encoding, modulation, multiplexing, up-conversion, combination, and the like. In one embodiment, at least one of such signal processing component(s) can embody a termination system (e.g., a cable modem termination system (CMTS)). In other embodiments, each edge originating node of the group of one or more edge originating nodes 224 can embody a network router (e.g., broadband remote access server (BRAS)) or a network switch (e.g., a DSLAM) for transmission of information streams based on a packet-switched (PS) communication protocol (e.g., internet protocol). While illustrated as a single block, in one or more embodiment(s), distribution platform 220 can be distributed, having a centralized deployment site (or plant) and a plurality of hub sites (also referred to as sites). In such embodiment(s), each one of the hub sites can comprise an edge originating node of the group of one or more edge originating nodes 224.

The distribution platform 220 can receive data (data flows, audio signals, video signals, any combinations thereof, etc.) and signaling (control instructions, clock signals, etc.) from a unit that is part, for example, of core network platform 230 or that is functionally coupled thereto. Such unit can relay the data from the CDN 140. In addition or in the alternative, the unit can originate the data and signaling, and convey such information to the distribution platform 220. In one scenario, the unit can be a server (e.g., one of server(s) 232) that can supply a combination of audio signal and video signal, such as an audiovisual signal comprising a video asset. The server can be, for example, the foregoing content server (not shown) which can generate media content for pay-per-view programming or video-on-demand assets, an application server (e.g., an email server), a data server, a telephony server, a backbone network router, or the like. In such scenario, based on the formatting of the audiovisual signal, one or more signal processing components (not shown) in the distribution platform 220 can process (encode, encrypt, modulate, multiplex, up-convert, combine) the audiovisual signal and supply a resulting audiovisual signal to an edge originating node of the group of one or more edge originating nodes 224. An edge originating node can transmit a plurality of data streams, conveying at least a portion of the audiovisual signal. It should be appreciated that in certain embodiments, the edge originating node can process the audiovisual signal without reliance on such one or more signal processing components. In another scenario, a source node (e.g., a satellite transceiver coupled to an asset source) can be coupled to the distribution platform 220 and can generate an audiovisual signal, which can be processed by one or more processing components and supplied to an edge originating node of the one or more edge originating nodes 224. Such edge originating node can transmit a plurality of data streams conveying at least a portion of the audiovisual signal.

As illustrated, the exemplary embodiment 200 also can comprise a fragmentor unit 240 that can encapsulate, or partition, the media content into fragments, or data objects. In one aspect, the fragmentor unit 240 can format the fragments, or data objects, in accordance with any format (e.g., JFIF) suitable for packet-switched transmission of media content. Encapsulation into fragments, also referred to as fragmentation, of a media asset can comprise compression of such asset. In one implementation, compression can be accomplished according to the JPEG compression method. While in the illustrated embodiment the fragmentor unit 240 is external to the core network platform 230—as it may be the scenario when content is encapsulated by an entity other than a service provider that operates the core network platform 230—in other embodiments the fragmentor unit 240 can be part of the core network platform 230 (e.g., a server of the server(s) 232 can comprise or embody the fragmentor unit 240.

In the illustrated embodiment, the A/D network 120 also can comprise a transport network 210 can be a WAN that can be embodied in a wireless network, a wireline network, or a combination thereof, and supplies data service(s), such as television programming, video on demand, internet service, packet-switched telephony, to a user location which can be stationary (e.g., a location of a dwelling (residential or enterprise)) or mobile (e.g., a location of a mobile device). Transport network 210 can be embodied in an optic fiber network, a coaxial cable network, or an HFC network, an optic fiber network, a coaxial network, a wireless network, and the like. In an embodiment in which the transport network 210 is an HFC network, data pipe and signaling 205 can comprise several optic fiber links and associated optical functional elements, such as downstream lasers, light amplifiers, last-mile fiber aggregator node, and the like. In addition, in such embodiment, the transport network 210 can comprise various RF amplifiers and coaxial taps to respective dwellings (residential, multi-unit, enterprise, etc.) wherein the device 110 can consume a data service (e.g., internet service) provided through the various networks in the exemplary network environment 100. In one aspect, the device 110 can be functionally coupled to a cable modem or other device (e.g., a network interface device (NID)) that serves as the network gateway to the dwelling network from the transport network 210. As another illustration, in an embodiment in which the transport network 210 is a wired broadband packet-switched network, data and signaling pipes 215 and 205 can comprise Ethernet links, T-1 carriers, and/or fiber optic links, and can include network routers such as BRASs and network switching, such as DSLAMs. The network switches can be functionally coupled to home gateways (e.g., DSL modems) in a dwelling in which the device 110 can consume or can enable data services (e.g., internet service) provided through the various networks in the exemplary network environment 100.

As described herein, the network 120, via a functional element thereof, can be functionally coupled to the network repository for which the object request 116 is intended to. In the exemplary network environment 100, a CDN 140 embodies the network repository. The CDN 140 can comprise a set of one or more edge cache nodes 130 and at least one intermediate layer having one or more cache nodes. In the illustrated embodiment, the CDN 140 comprises two intermediate layers: a first layer comprising a set one or more cache nodes 132, and a second layer comprising a set of one or more cache nodes 134. In one aspect, an intermediate layer can increase redundancy and thus increase resilience of the CDN 140 to failure and accessibility to information retained therein. The set of one or more edge cache nodes 130 can be functionally coupled, via a data and signaling pipe 135, to at least one (e.g., one, two, more than two, all) of the cache nodes of the set of one or more cache nodes 132. In scenarios in which the set of one or more cache nodes 132 comprises at least two nodes, the at least two nodes can be mutually functionally coupled. At least one cache node of the set of one or more cache nodes 132 can be functionally coupled, via a data and signaling pipe 137, to at least one node of a set of one or more cache nodes 134. In scenarios in which the set of one or more cache nodes 134 comprises at least two nodes, at least such nodes can be mutually functionally coupled. At least one node of the set of one or more cache nodes 134 can be functionally coupled, via a data and signaling pipe 139, to an origin node 150 (which also can be referred to as a central node 150).

In one aspect of the exemplary network environment 100, functional connectivity among the edge cache node(s) 130, the cache node(s) 132, and the cache node(s) 134 permits indirect functional coupling (wired, wireless, or any combination thereof) among at least one of the edge cache node(s) 130 and the origin node 150. Such coupling can permit transmission of information (such as the object request 116) from a specific one of the edge cache node(s) 130 to the origin node 150. Similarly, such indirect coupling can permit transmission of information (e.g., data or metadata) from the origin node 150 to the specific node of the edge cache node(s) 130. In additional or alternative embodiments of exemplary network environment 100, the intermediate layers of cache nodes (e.g., cache node(s) 132 and cache node(s) 134) can be absent, permitting direct functional coupling, and related information exchange, among at least one edge cache node of the edge cache node(s) 130 and the origin node 150.

In one aspect, the CDN 140 can have a larger geographical scope than the network 120. In one embodiment, communication through the link 135 can be effected in accordance with one or more packet-switched protocols, such as TCP/IP, UDP, Ethernet protocol, or the like. Similarly to other data and signaling pipes described herein, the data and signaling pipe 135 can comprise one or more of: a reference link, and related components; a conventional bus architectures such as address buses, system buses; wired links, such as fiber optic lines, coaxial lines, hybrid fiber-coaxial links, Ethernet lines, T-carrier lines, twisted-pair line, or the like, and various connectors (e.g., an Ethernet connector, an F connector, an RS-232 connector, or the like); wireless links, including terrestrial wireless links, satellite-based wireless links, or a combination thereof; and so forth.

As illustrated, the network 120 is functionally coupled to the CDN 140 via a data and signaling pipe 125 having an UL and a DL. The data and signaling pipe 125 can comprise one or more of: a reference link, and related components; a conventional bus architectures such as address buses, system buses; wired links, such as fiber optic lines, coaxial lines, hybrid fiber-coaxial links, Ethernet lines, T-carrier lines, twisted-pair line, or the like, and various connectors (e.g., an Ethernet connector, an F connector, an RS-232 connector, or the like); wireless links, including terrestrial wireless links, satellite-based wireless links, or a combination thereof; and so forth.

In one aspect, the network 120 can be functionally coupled to communicate with the CDN 140 via an edge cache node of the set of one or more edge cache nodes 130. A functional element, (e.g., a server or a gateway node) of the network 120 can enable such coupling. Such functional element can deliver the object request 116 to such edge cache node, wherein the edge cache node can be configured to receive information indicative of a requested data object, and can process the object request 116 as part of a response to the query conveyed by such request. Such information can be formatted according to a specific communication protocol, such as a web-based communication protocol which can comprise at least one of HTTP, SOAP, or SNMP.

To process the object request 116, which, for example, can comprise a first identifier (e.g., a key ID) indicative of a first value (e.g. a received key value) and a second identifier indicative of the second value (e.g., a reference hash value), the edge cache node of the set of one or more edge cache nodes 130 can determine if the request is legitimate based at least on the second value. In certain embodiments, the first identifier and the second identifier can be embodied or can comprise in respective portions of a uniform resource locator (URL) embodying the object request 116. It should be appreciated that the edge cache node can ascertain the validity of the object request 116 algorithmically, as opposed to empirically, for example. Therefore, in view of the incorporation of data indicative of the key ID and the second value (e.g., a hash value) into the object request 116, such request can serve as a self-validating resource locator. It should be appreciated that in scenarios in which the second value is a hash value, the hash value can be generated via a signed hashing (or signed hash method) that can contain the key value that is included or embodied in the first value contained in the request 116. Accordingly, the second value can be a signed hash value signed by the key value included or embodied in the first value. To determine if the request is valid based at least on the second value, the edge cache node can, initially, validate the first value by ascertaining that the received key value associated with the first value is present in a mapping that relates at least one key identifier to at least one key value. The mapping can be, in one aspect, a one-to-one mapping, a one-to-many mapping, or a many-to-many mapping. In one embodiment (e.g., edge cache node 310 in FIG. 3), the mapping (e.g., one of the ID-value mapping(s) 321) can be contained in a memory (e.g., data storage 320) of the edge cache node. In one implementation, the mapping can be provisioned to the edge cache node (e.g., edge cache node 310) in a similar manner to provisioning of a delivery service (DS) name. In one aspect, each of the edge cache nodes of the one or more edge cache nodes 130 can be provisioned with key information, such as key values, ID-value mappings, acceptable formats for key IDs, and the like, in a manner similar to that of provisioning DS(s) to each of such nodes. The key information can be encrypted prior to storage in the edge cache node.

In response to the first value being valid, the edge cache node can determine a third value, such as a checksum value, by evaluating a function (e.g., a hash function) of data indicative of at least a portion of the information (e.g., the URL name) indicative of the requested data object. In one aspect, the checksum value can include a key value that renders the checksum value a signed checksum value, wherein the key value can be the valid first value. To determine the third value, the edge cache node can determine the checksum value by performing a hash, e.g., implementing a specific hash algorithm (or hashing), of at least a portion of the information. The hashing can be a signed hashing which contains a key value in the specific hash algorithm associated with the signed hashing. In contrast to non-signed conventional hashing, the signed hashing can yield a signed checksum value, or signed hash value, being signed according to the key value. For a third value that coincides with the second value conveyed by the object request 116, such request is deemed valid. In an example scenario, for an object request 116 embodied in "http://streamer02.delivery-service-name.cdn2.comcast.net/key-id(138)/espn/timecode(42)/qualitylevel(300000)/hash(4ed345)", at least the portion of the information can be embodied in "key-id(138)/espn/timecode(42)/qualitylevel(300000)/hash(4ed345)". In addition, in such example, the key value is "138", whereas the reference hash value is "4ed345". Upon or after validation of the "138" value, the edge cache node can determine the checksum value associated with such value and the portion of the foregoing URL by computing an MD5 message-digest algorithm, for example. If outcome of such computation does not yield "4ed345", the exemplary object request 116 is invalid and the edge cache node can transmit an error notification such as an HTTP 404 status code.

In response to the object request 116 being valid, or legitimate, the edge cache node can proceed with processing the object request 116. As part of such processing, in one aspect, the edge cache node can transmit the object request 116 to the origin node 150. The edge cache node can receive, from the origin node 150, the data object (e.g., a media content fragment) requested in the object request 116 in response to such request. In response to the object request 116 being invalid, or non-legitimate, the edge cache node can transmit an error notification (e.g., an HTTP 404 status code) to the device 110, via the network 120.

For the exemplary embodiment 200 of the network 120, in response to generation of a fragment, or a data object, the described content server (not shown) and the fragmentor unit 240 can issue a key value and can compute a hash value associated with the key value and at least a portion of an object resource locator (e.g., a URL) assigned to the fragment, or the data object. Such hash value can be the reference hash value for the key and at least the portion of the object resource locator. In one aspect, for linear-programming assets, the fragmentor unit 240 can compute hash values for respective TC+1 and TC+2 and each quality level associated therewith. The fragmentor unit 240 can retain such values in a universally unique identifier (UUID) box, or field, of a specific length in bytes in a fragment header. The term box generally is employed in reference to Moving Pictures Experts Groups (MPEG)-formatted fragments. The device 110 can exploit such information to determine a suitable hash value to be employed for next-timecode and qualitylevel values for insertion into an object resource locator associated with an object request. The fragmentor unit 240 also can utilize an encryption key that can be available to one or more components of the distribution platform 220, or a new UUID box, or field, of a specific length in bytes can be inserted into a fragment (e.g., a movie fragment (or MOOF, as referred to in MPEG-4 formatted content) which details a key ID to be incorporated into the object resource locator.

In another aspect, for non-linear assets, such as video-on-demand assets or time-shifted assets, the fragmentor unit 240 can add a new field to each chunk time reference which can include the hash value to be employed for a current timecode and each possible quality level. The key ID that can be utilized in an object resource locator (e.g., a URL) can be provided to the device 110 as part of a manifest metadata.

Figure 3:
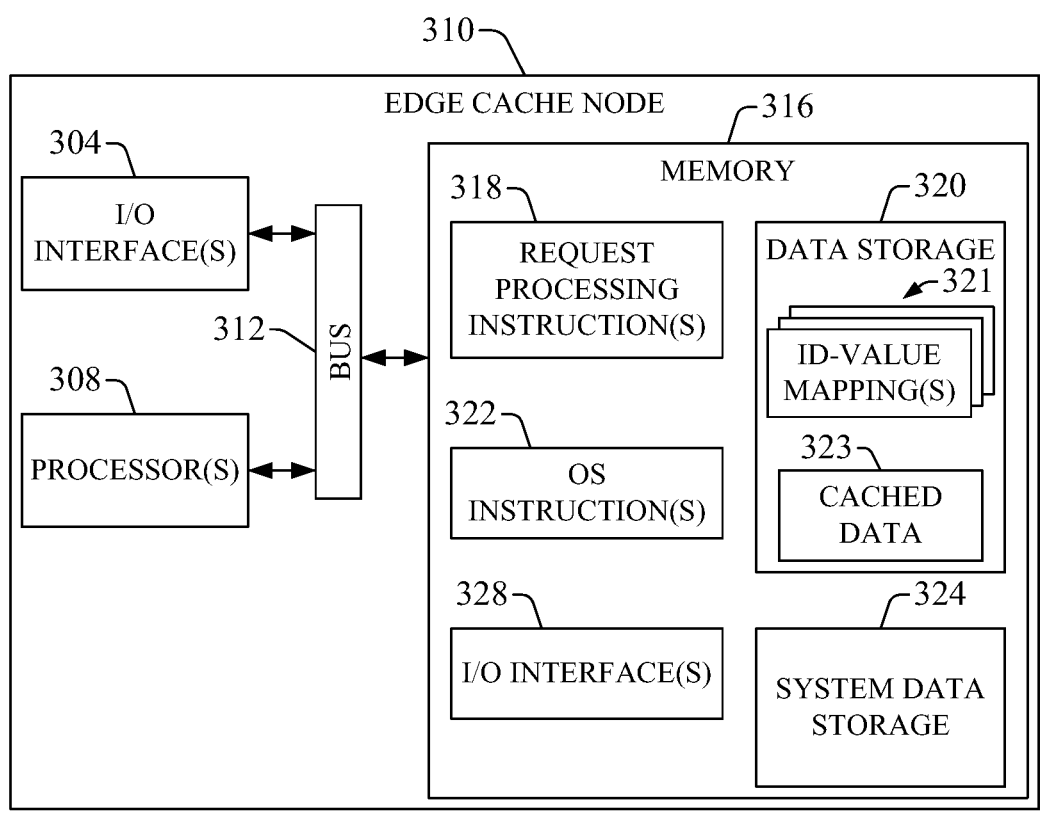
FIG. 3 illustrates an exemplary embodiment of a network node in accordance with one or more aspects of the disclosure.

FIG. 3 is a block diagram of an exemplary embodiment of an edge cache node 310 in accordance with one or more aspects of the disclosure. Edge cache node 310 is an apparatus that can embody or can comprise a node of the set of one or more network edge nodes 130. In certain embodiments, edge cache node 310 can embody or can comprise a node in the set of one or more cache nodes 132 or in the set of one or more cache nodes 134. In the illustrated embodiment, the network node 310 comprises a group of one or more I/O interfaces 304, a group of one or more processors 308, a memory 316, and a bus 312 that functionally couples (e.g., communicatively couples) various functional elements of the edge cached node 310 including the group of one or more processors 308 to the memory 316. In scenarios in which operation of network node 310 can be critical to network performance, such as in guaranteed service quality (e.g., guaranteed bit rate) scenarios, the group of one or more processors 308 can comprise a plurality of processors that can exploit concurrent computing.

Functionality of edge cache node 310 can be configured by a group of computer-executable instructions (e.g., programming code instructions or programming modules) that can be executed by a processor of the one or more processors 308. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor. For example, a first group of computer-executable instructions can configure logic that, in response to execution by the processor, enables the edge cache node 310 to operate as a server (a provisioning server, an AAA server, a proxy server, a communication management server, an application server, etc.), a gateway node (a session border controller (SBC), or a media gateway control function ((MGCF), etc.).

Data and computer-accessible instructions, e.g., computer-readable instructions and computer-executable instructions, associated with specific functionality of the edge cache node 310 can be retained in memory 316. Such data and instructions can permit implementation, at least in part, of the validation of a request for an asset (e.g., a data object) based on information in the request in accordance with aspects described herein. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions, e.g., computer-readable and computer-executable instructions, and data can reside at various times in different storage elements (registers, files, memory addresses, etc.; not shown) in memory 316.

Data storage 320 can comprise a variety of data, metadata, or both associated with validation of a request for an asset (e.g., a data object) based on information in the request in accordance with aspects described herein. Memory 316 also can comprise one or more computer-executable instructions for implementation of specific functionality of the edge cache node 310 in connection with the validation of a request for an asset (e.g., a data object) based on information in the request described herein. Such computer-executable instructions can be retained as a memory element labeled request processing instruction(s) 318. In one aspect, as described herein, the request processing instruction(s) 318 can be stored as an implementation (e.g., a compiled instance) of one or more computer-executable instructions that implement and thus provide at least the functionality of the methods described herein. The request processing instruction(s) 318 also can be transmitted across some form of computer readable media. It should be appreciate that different request processing instructions can render physically alike edge cache nodes into functionally different components, with functional differences dictated by logic (e.g., computer-executable instructions and data) specific to each one of such network nodes and defined by the request processing instructions.

Memory 316 can be embodied in a variety of computer-readable media. Exemplary computer-readable media can be any available media that is accessible by a processor in a computing device, such as one processor of the group of one or more processors 308, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 316 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 316 can be partitioned into a system memory (not shown) that can contain data and/or programming modules that enable essential operation and control of the edge cache node 310. Such program modules can be implemented (e.g., compiled and stored) in memory element 322, referred to as operating system (OS) instruction(s) 322, whereas such data can be system data that is retained in memory element 324, referred to as system data storage 324. The OS instruction(s) 322 and system data storage 324 can be immediately accessible to and/or are presently operated on by at least one processor of the group of one or more processors 308. The OS instruction(s) 322 can embody an operating system for the edge cache node 310. Specific implementation of such OS can depend in part on architectural complexity of the edge cache unit 310. Higher complexity affords higher-level OSs. Example operating systems can include Unix, Linux, iOS, Windows operating system, and substantially any operating system for a computing device.

Memory 316 can comprise other removable/non-removable, volatile/non-volatile computer-readable non-transitory storage media. As an example, memory 316 can include a mass storage unit (not shown) which can provide non-volatile storage of computer code, computer readable instructions, data structures, program modules, and other data for the edge cache node 310. A specific implementation of such mass storage unit (not shown) can depend on desired form factor of and space available for deployment of the edge cache node 310. For suitable form factors and sizes of the monitoring device, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of validation of a request for an asset (e.g., a data object) based on information in the request in accordance with aspects described herein can be performed, at least in part, in response to execution of software components (e.g., one or more implementations of request processing instruction(s) 318) by a processor. In particular, yet not exclusively, to provide the specific functionality of edge cache node 310, a processor of the group of one or more processors 308 in edge cache node 310 can execute at least a portion of request processing instruction(s) 318, consuming data from or injecting data into data storage 320 in accordance with aspects of the disclosure, wherein such data can be retained in a memory element (e.g., register, file, database, memory page, or the like) labeled cached data 323.

In general, a processor of the group of one or more processors 308 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 308 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 308 can be implemented as a combination of computing processing units.

The one or more input/output (I/O) interfaces 304 can functionally couple (e.g., communicatively couple) edge cache node 310 to another functional element (component, unit, server, gateway node, repository, etc.) of network 120, for example. Functionality of the edge cache node 310 that is associated with data I/O or signaling I/O can be accomplished in response to execution, by a processor of the group of one or more processors 308, of at least one I/O interface retained in memory element 328. Such memory element being represented by the block I/O interface(s) 328. In some embodiments, the at least one I/O interface embodies an API that permit exchange of data or signaling, or both, via an I/O interface of I/O interface(s) 304. In certain embodiments, the one or more I/O interfaces 304 can include at least one port that can permit connection of the edge cache node 310 to other functional element of the exemplary network environment 100. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 304 can enable delivery of output (e.g., output data, output signaling) to such functional element. Such output can represent an outcome or a specific action of one or more actions described herein, such as in the method of FIG. 5.

Bus 312 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

Figure 4:
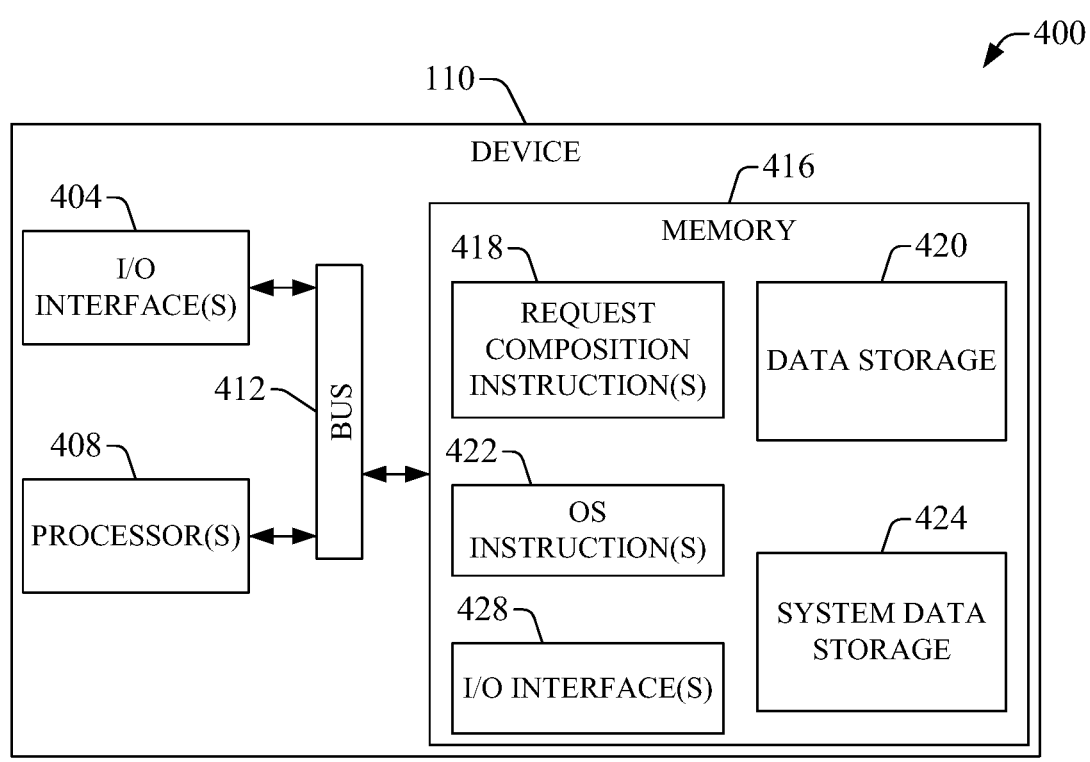
FIG. 4 illustrates an exemplary embodiment of a device in accordance with one or more aspects of the disclosure.

FIG. 4 is a block diagram of an exemplary embodiment 400 of the device 110 in accordance with one or more aspects of the disclosure. As described herein, the device 110, in the exemplary embodiment 400 can communicate a self-validating request for a data object associated with a media asset. In the illustrated embodiment, the device 110 can comprise a memory 416 having computer-accessible instructions, e.g., computer-readable computer-executable instructions, encoded thereon. Such instructions can be retained as request composition instruction(s) in a memory element 418. In addition, the device 110 can comprise a processor (e.g., one of processor(s) 408) functionally coupled to the memory 416 and configured, by the computer-executable instructions. The processor also can be configured to generate a request for a data object, the request comprising an identifier indicative of a first value, and a second value, and to transmit the request for the data object to a first network node, wherein the first network node is configured to validate the request and, in response to the request being valid, transmit the request to a second network node. In certain embodiments, the first network node can be one of network edge cache node(s) 130. In one aspect, the first value can be a key identifier of a key value in a mapping relating at least one key identifier to at least one key value. The second value is a predetermined hash value related to the key value. In one aspect, as described herein, the predetermined hash value can comprise the key value and can be referred to as a signed hash value.

To generate the request for the data object, the processor can be configured to format the request according to a specific communication protocol, the data object being a media content fragment. In one aspect, the specific communication protocol can be a web-based communication protocol comprising at least one of hypertext transfer protocol (HTTP), simple object access protocol (SOAP), or simple network management protocol (SNMP).

As illustrated, in the exemplary embodiment 400, the device 110 comprises a group of one or more I/O interfaces 404, a group of one or more processors 408, a memory 416, and a bus 412 that functionally couples various functional elements of the device 110 including the group of one or more processors 408 to the memory 416. In scenarios in which operation of the device 110 can be critical to network performance, such as in guaranteed service quality scenarios, the group of one or more processors 408 can comprise a plurality of processors that can exploit concurrent computing.

Functionality of the device 110 can be configured by a group of computer-executable instructions (e.g., programming code instructions or programming modules) that can be executed by a processor of the one or more processors 408. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor.

Data and computer-accessible instructions, e.g., computer-readable instructions and computer-executable instructions, associated with specific functionality of the device 110 can be retained in memory 416. Such data and instructions can permit implementation, at least in part, of the validation of a request for an asset (e.g., a data object) based on information in the request in accordance with aspects described herein. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions, e.g., computer-readable and computer-executable instructions, and data can reside at various times in different storage elements (registers, files, memory addresses, etc.; not shown) in memory 416.

Data storage 420 can comprise a variety of data, metadata, or both associated with request of objects (e.g., fragments) in accordance with aspects described herein. Memory 416 also can comprise one or more computer-executable instructions for implementation of specific functionality of the device 110 in connection with requesting an object in accordance with aspects described herein. Such computer-executable instructions can be retained as a memory element labeled request composition instruction(s) 418. In one aspect, as described herein, the request composition instruction(s) 418 can be stored as an implementation (e.g., a compiled instance) of one or more computer-executable instructions that implement and thus provide at least the functionality of the methods described in the disclosure. The request composition instruction(s) 418 also can be transmitted across some form of computer readable media. It should be appreciate that different request composition instruction(s) can render physically alike devices into functionally different components, with functional differences dictated by logic (e.g., computer-executable instructions and data) specific to each one of such network nodes and defined by the request composition instruction(s) 418.

Memory 416 can be embodied in a variety of computer-readable media. Exemplary computer-readable media can be any available media that is accessible by a processor in a computing device, such as one processor of the group of one or more processors 408, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 416 can comprise computer-readable non-transitory storage media in the form of volatile memory, such as RAM, EEPROM, and the like, or non-volatile memory such as ROM. In one aspect, memory 416 can be partitioned into a system memory (not shown) that can contain data and/or programming modules that enable essential operation and control of the device 110. Such program modules can be implemented (e.g., compiled and stored) in memory element 418, referred to as OS instruction(s) 422, whereas such data can be system data that is retained in memory element 424, referred to as system data storage 424. The OS instruction(s) 422 and system data storage 424 can be immediately accessible to and/or are presently operated on by at least one processor of the group of one or more processors 408. The OS instruction(s) 422 can embody an operating system for the device 110. Specific implementation of such OS can depend in part on architectural complexity of the device 110. Higher complexity affords higher-level OSs. Example operating systems can include Unix, Linux, iOS, Windows operating system, and substantially any operating system for a computing device.

Memory 416 can comprise other removable/non-removable, volatile/non-volatile computer-readable non-transitory storage media. As an example, memory 416 can include a mass storage unit (not shown) which can provide non-volatile storage of computer code, computer readable instructions, data structures, program modules, and other data for the device 110. A specific implementation of such mass storage unit (not shown) can depend on desired form factor of and space available for deployment of the device 110. For suitable form factors and sizes of the monitoring device, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of validation of a request for an asset (e.g., a data object) based on information in the request in accordance with aspects described herein can be performed, at least in part, in response to execution of software components (e.g., one or more implementations of request composition instruction(s) 418) by a processor. In particular, yet not exclusively, to provide the specific functionality of device 110, a processor of the group of one or more processors 408 in device 110 can execute at least a portion of the request composition instruction(s) 418.

In general, a processor of the group of one or more processors 408 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 408 can refer to an integrated circuit with dedicated functionality, such as an ASIC, a DSP, a FPGA, a CPLD, a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 308 can be implemented as a combination of computing processing units.

The one or more input/output (I/O) interfaces 404 can functionally couple (e.g., communicatively couple) device 110 to another functional element (component, unit, server, gateway node, repository, etc.) of network 120, for example. Functionality of the device 110 that is associated with data I/O or signaling I/O can be accomplished in response to execution, by a processor of the group of one or more processors 408, of at least one I/O interface retained in memory element 428. Such memory element being represented by the block I/O interface(s) 428. In some embodiments, the at least one I/O interface embodies an API that permit exchange of data or signaling, or both, via an I/O interface of I/O interface(s) 404. In certain embodiments, the one or more I/O interfaces 404 can include at least one port that can permit connection of the device 110 to other functional element of the exemplary network environment 100. In one or more scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 404 can enable delivery of output (e.g., output data, output signaling) to such functional element. Such output can represent an outcome or a specific action of one or more actions described herein, such as action(s) in exemplary methods of FIG. 5 and/or FIG. 6.

Bus 412 represents one or more of several types of bus structures, including a memory bus or memory controller, a peripheral bus, an accelerated graphics port, and a processor or local bus using any of a variety of bus architectures. As an example, such architectures can comprise an ISA bus, an MCA bus, an EISA bus, a VESA local bus, an AGP bus, and a PCI, a PCI-Express bus, a PCMCIA bus, a USB bus, or the like.

Figure 5:
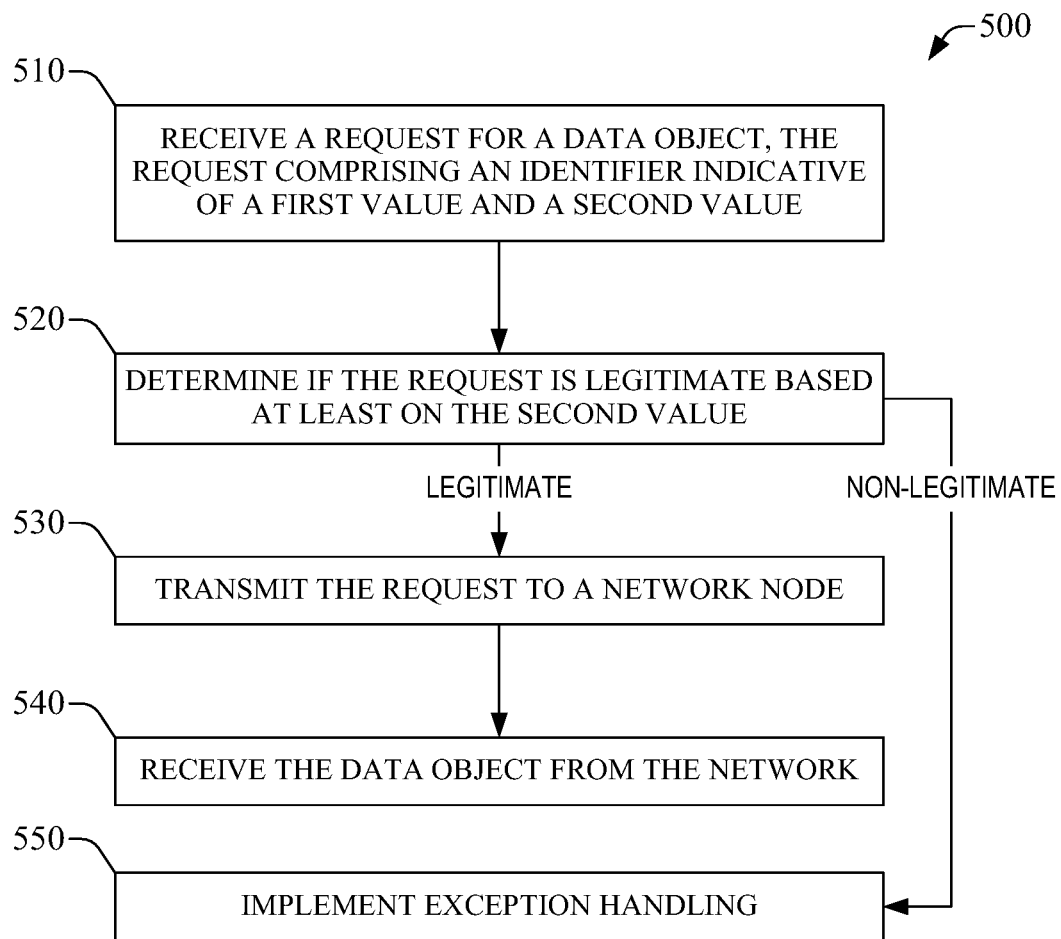
FIGS. 5-6 illustrate exemplary methods in accordance with one or more aspects of the disclosure.
Figure 6:
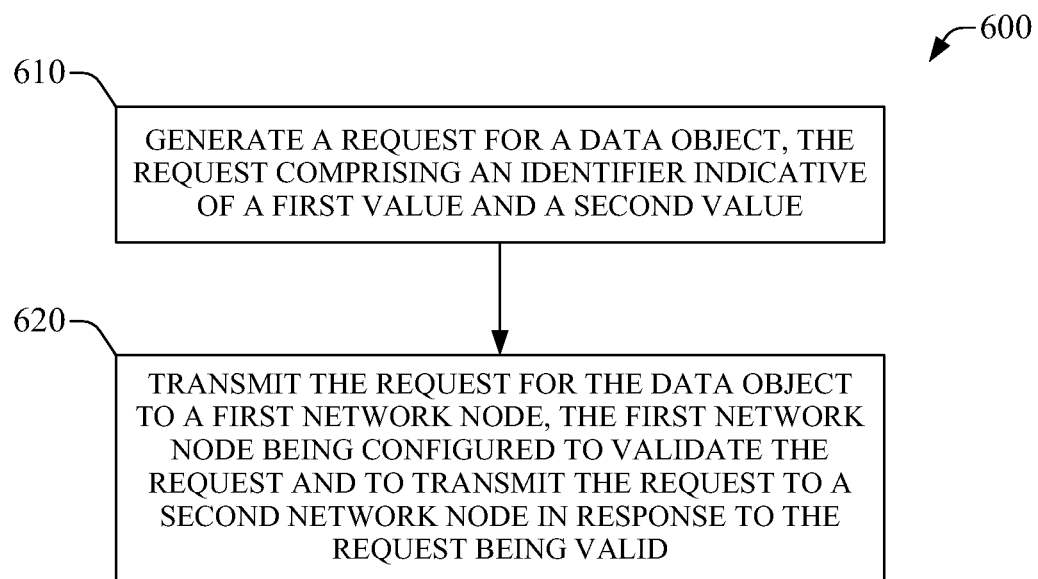

In view of the various aspects of processing a request for an asset in a network, such as those described herein, exemplary methods that can be implemented in accordance with the disclosure can be better appreciated with reference to the flowcharts in FIGS. 5-6. For simplicity of explanation, the exemplary methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the subject disclosure can alternatively be represented as a series of interrelated states or events, such as in a state diagram. Moreover, when disparate functional elements (network nodes, units, etc.) implement disparate portions of the methods of the subject disclosure, an interaction diagram or a call flow can represent such methods or processes. Furthermore, not all illustrated actions or messages may be required to implement a method in accordance with the subject disclosure. Further yet, in the illustrated call flows, messages related to routing the emergency communication are represented with an open-head arrow to pictorially indicate that one or more network components in addition to those illustrated as receiving a message can enable delivery and related reception of the message within the call flow.

The methods disclosed throughout the subject specification can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIG. 5 is a flowchart of exemplary method 500 for processing a request for an asset according to one or more aspects of the disclosure. The exemplary method 500 can be implemented (e.g., performed or executed) by a computing device, such as an edge cache node (e.g., a node of the one or more edge cache nodes 130) or a processor of the edge cache node or functionally coupled thereto. In certain embodiments, the edge cache node can implement one or more blocks of the exemplary method 500 in addition to implementing other logic such as validating a delivery service (DS) associated with the edge cache node.

At block 510, a request for a data object is received. The request can comprise a first identifier indicative of a first value and a second identifier indicative of a second value. In one aspect, as described herein, the first value can be a key identifier (key ID) of a key value in a mapping relating at least one key ID to at least one key value. The second value can be a predetermined hash value related to the key value. In another aspect, also as described herein, the data object can be associated with a media asset (e.g., linear-programming asset or a non-linear asset, such as media-on-demand). The request (e.g., object request 116) can be formatted in accordance with various packet-switched communication protocols, such as HTTP, SOAP, SNMP, or the like. Receiving the request can comprise receiving information (e.g., a URL name) indicative of the data object, wherein the information can be formatted according to a specific communication protocol.

At block 520, it is determined (e.g., by the device that implements the subject exemplary method) if the request is legitimate based at least on the second value. Block 520 can be referred to as a determining action which, in one embodiment, can comprise determining a hash value by evaluating a hash function (e.g., the MD5 message-digest algorithm) of the data indicative of at least a portion of the information (e.g., the URL name) in response to the key value being valid. In addition, the determining action can comprise comparing the hash value, which can be a signed hash value, as described herein, to the second value. In response to the hash value being equal to the second value, the request can be deemed to be valid. In another embodiment, the determining action can comprise validating the first value, and determining a third value, such as a checksum value, by evaluating a function of data indicative of at least a portion of the information (e.g., the URL name) in response to the first value being valid. It should be appreciated that the function can be a hash function. In such embodiment, the determining action can comprise comparing the third value, which can be a signed checksum value, as described herein, to the second value. In response to the third value being equal to the second value, the request can be deemed to be valid. In one aspect, validating the first value can comprise validating a key value in a mapping relating at least one key identifier to at least one key value.

In response to the request being determined to be legitimate, the request is transmitted to a network node at block 530. The network edge node that can implement the exemplary method 500 can be deemed to be a first network node, thus the network node of block 520 can be deemed to be a second network node (e.g., origin node 150). In response to the transmitting action (represented by block 530), the data object is received from the network node at block 540. Block 540 can be referred to as the receiving action which, in one embodiment, can comprise receiving information indicative of the data object. The information can be formatted according to a specific packet-switched communication protocol. In an alternative scenario, in response to the request being determined to be non-legitimate, an error notification (e.g., an HTTP 404 status code) can be transmitted to another network node, which can be referred to as a third network node. As described herein, the third network node can be device 110. In the alternative, in response to the request being non-legitimate, exception handling can be implemented at block 550. For instance, in one aspect, an error notification (e.g., an exception) can be transmitted to another network node—transmission of the error notification can be or can comprise the exception handling.

FIG. 6 is a flowchart of an exemplary method 600 for submitting a request for an asset according to one or more aspects of the disclosure. The exemplary method 600 can be implemented (e.g., performed or executed) by a computing device, such as device 110, configured to communicate or in communication with a network repository (e.g., CDN 140). In addition or in the alternative, a processor of the computing device or functionally coupled thereto can implement (e.g., perform or execute) the exemplary method 600. At block 610, a request for a data object is generated, the request can comprise an identifier indicative of a first value and a second value. In one aspect, the first value and/or the second value can be represented as one or more of a numeric string (e.g., a binary number, a decimal number, a hexadecimal number, or the like), an alphabetic string, an alphanumeric string, or the like.

At block 620, the request for the data object can be transmitted to a first node (e.g., an edge node cache node). The data object can be or can comprise a media content fragment. In one aspect, the first network node can be configured to validate the request and to transmit the request to a second network node in response to the request being valid. In another aspect, generating the request for the data object can comprise formatting the request according to a specific communication protocol. The specific communication protocol can be a web-based communication protocol comprising one or more of HTTP, SOAP, or SNMP.

Various advantages related to validation of a request for an asset (e.g., a data object) based on information in the request in a network repository (e.g., a CDN, such as CDN 140) emerge from the foregoing description. For example, sparsity of the name space of fragments associated with media assets is accounted for by integrating information into the queries, the information permitting validation of a query prior to consuming processing resources of an originating node. It should be appreciated that such integration can be accomplished without substantive processing overhead, in view that a network edge node that processes such queries typically has available processing resources since the node, being a cache node, can be primarily bound by read/write operations. For another example, mitigation or avoidance of processing of non-legitimate queries for fragments can readily protect origin node(s) from denial-of-service attacks.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

The invention claimed is:

1. A method comprising:
  receiving, by a computing device, a request for content comprising a plurality of content fragments, wherein the request comprises a Uniform Resource Locator (URL) comprising a first portion indicative of a key value and a second portion indicative of a reference hash value;
  determining, based on the key value being valid, a hash value, wherein the hash value is associated with the first portion of the URL and the key value;
  determining, based on the hash value matching the reference hash value of the second portion of the URL, that the request is legitimate, wherein the reference hash value is indicative of a time code and a quality level for the content; and causing, based on the request being legitimate, a first content fragment of the plurality of content fragments to be output, wherein the first content fragment is associated with the time code and the quality level.

2. The method of claim 1, wherein the first portion of the URL comprises a first identifier for the key value, and wherein the method further comprises:
 determining, based on the first portion, that the key value maps to the first identifier; and
 based on the key value mapping to the first identifier, determining, based on the first identifier, that the key value is valid.

3. The method of claim 1, wherein causing the first content fragment to be output comprises: sending, to a network node, a request for the first content fragment, wherein the network node sends the first content fragment to a user device associated with the request for the content.

4. The method of claim 1, wherein causing the first content fragment to be output comprises: sending, by the computing device, the first content fragment to a user device associated with the request for the content.

5. The method of claim 1, wherein determining the hash value comprises:
 hashing the first portion of the URL with the key value.

6. The method of claim 1, further comprising:
 receiving, by a user device, a manifest for the content, wherein the manifest comprises the key value; and
 sending, by the user device and based on the manifest, the request for the content.

7. The method of claim 1, further comprising:
 generating, by a user device, the request for the content; and
 sending, by the user device to the computing device, the request for the content.

8. One or more non-transitory computer-readable storage media storing processor-executable instructions that, when executed by at least one processor, cause the at least one processor to:
 receive a request for content comprising a plurality of content fragments, wherein the request comprises a Uniform Resource Locator (URL) comprising a first portion indicative of a key value and a second portion indicative of a reference hash value;
 determine, based on the key value being valid, a hash value, wherein the hash value is associated with the first portion of the URL and the key value;
 determine, based on the hash value matching the reference hash value of the second portion of the URL, that the request is legitimate, wherein the reference hash value is indicative of a time code and a quality level for the content; and
 cause, based on the request being legitimate, a first content fragment of the plurality of content fragments to be output, wherein the first content fragment is associated with the time code and the quality level.

9. The one or more non-transitory computer-readable storage media of claim 8, wherein the first portion of the URL comprises a first identifier for the key value, and wherein the processor-executable instructions further cause the at least one processor to:
 determine, based on the first portion, that the key value maps to the first identifier; and
 based on the key value mapping to the first identifier, determine, based on the first identifier, that the key value is valid.

10. The one or more non-transitory computer-readable storage media of claim 8, wherein the processor-executable instructions that cause the at least one processor to cause the first content fragment to be output further cause the at least one processor to:
 send, to a network node, a request for the first content fragment, wherein the network node sends the first content fragment to a user device associated with the request for the content.

11. The one or more non-transitory computer-readable storage media of claim 8, wherein the processor-executable instructions that cause the at least one processor to cause the first content fragment to be output further cause the at least one processor to:
 send the first content fragment to a user device associated with the request for the content.

12. The one or more non-transitory computer-readable storage media of claim 8, wherein the processor-executable instructions that cause the at least one processor to determine the hash value further cause the at least one processor to: hash the first portion of the URL with the key value.

13. The one or more non-transitory computer-readable storage media of claim 8, wherein a user device receives a manifest for the content, wherein the manifest comprises the key value, and wherein the user device sends the request for the content based on the manifest.

14. The one or more non-transitory computer-readable storage media of claim 8, wherein a user device generates the request for the content and sends the request to an upstream device.

15. An apparatus comprising:
 one or more processors; and
 memory storing processor-executable instructions that, when executed by the one or more processors, cause the apparatus to:
 receive a request for content comprising a plurality of content fragments, wherein the request comprises a Uniform Resource Locator (URL) comprising a first portion indicative of a key value and a second portion indicative of a reference hash value;
 determine, based on the key value being valid, a hash value, wherein the hash value is associated with the first portion of the URL and the key value;
 determine, based on the hash value matching the reference hash value of the second portion of the URL, that the request is legitimate, wherein the reference hash value is indicative of a time code and a quality level for the content; and
 cause, based on the request being legitimate, a first content fragment of the plurality of content fragments to be output, wherein the first content fragment is associated with the time code and the quality level.

16. The apparatus of claim 15, wherein the first portion of the URL comprises a first identifier for the key value, and wherein the processor-executable instructions further cause the apparatus to:
 determine, based on the first portion, that the key value maps to the first identifier; and
 based on the key value mapping to the first identifier, determine, based on the first identifier, that the key value is valid.

17. The apparatus of claim 15, wherein the processor-executable instructions that cause the apparatus to cause the first content fragment to be output further cause the apparatus to: send, to a network node, a request for the first content fragment, wherein the network node sends the first content fragment to a user device associated with the request for the content.

18. The apparatus of claim 15, wherein the processor-executable instructions that cause the apparatus to cause the first content fragment to be output further cause the apparatus to: send the first content fragment to a user device associated with the request for the content.

19. The apparatus of claim 15, wherein the processor-executable instructions that cause the apparatus to determine the hash value further cause the apparatus to: hash the first portion of the URL with the key value.

20. The apparatus of claim 15, wherein at least one of:
a user device receives a manifest for the content, wherein the manifest comprises the key value, and wherein the user device sends the request for the content based on the manifest; or
the user device generates the request for the content and sends the request to an upstream device.

\* \* \* \* \*